Nov. 9, 1926.  1,606,013
R. G. WULFF
TORCH FOR CUTTING CAST IRON
Filed Jan. 19, 1926
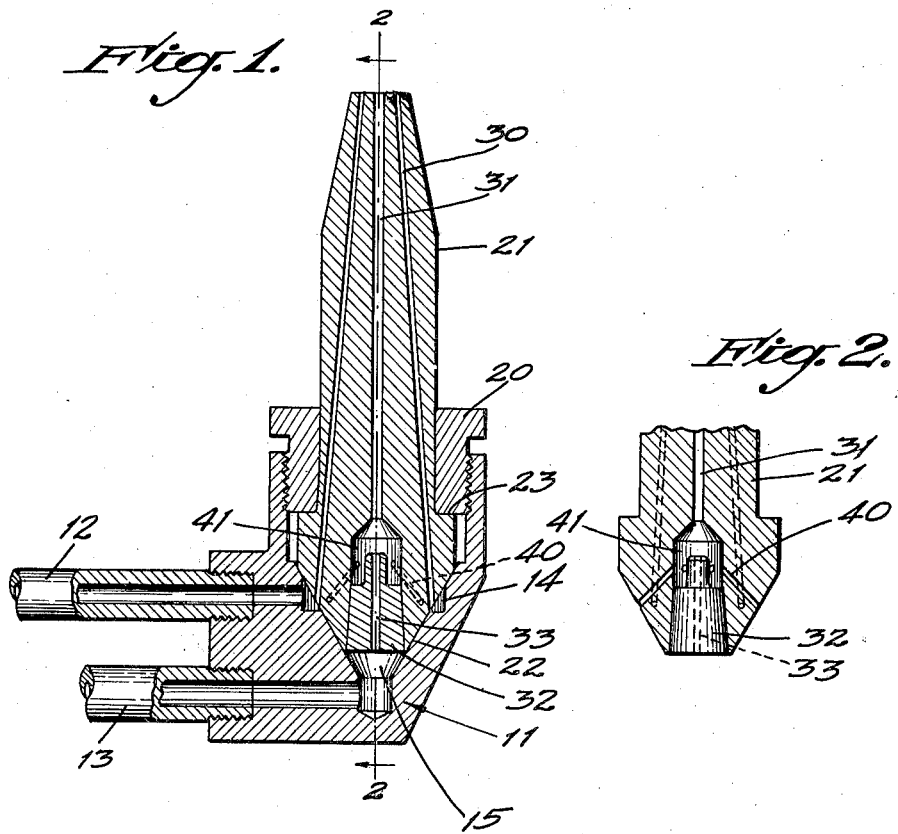
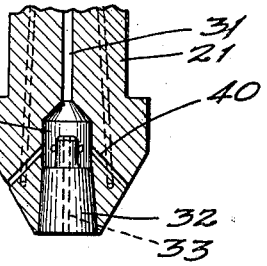
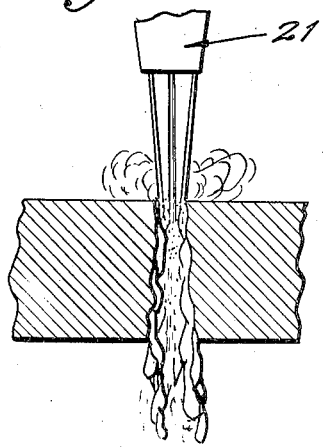
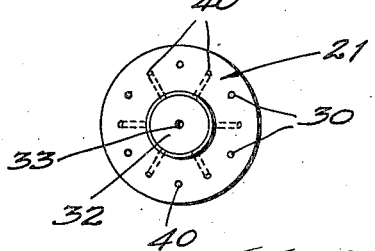
INVENTOR:
ROBERT G. WULFF,
BY
ATTORNEY Patented Nov. 9, 1926.

1,606,013

UNITED STATES PATENT OFFICE.

ROBERT G. WULFF, OF LOS ANGELES, CALIFORNIA, ASSIGNOR TO PUROX COMPANY, OF DENVER, COLORADO, A CORPORATION OF COLORADO.

TORCH FOR CUTTING CAST IRON.

Application filed January 19, 1926. Serial No. 82,231.

My invention relates to the art of cutting metal by means of oxygen gas applied to hot metal. In this art it is common to provide cutting torches which are usually provided with a plurality of heating flame orifices through which a mixture of acetylene and oxygen is projected to form a heating flame, the torch having usually a central orifice through which a jet of oxygen is forced against the hot metal. Such torches work very efficiently when applied to the cutting of steel, the hot steel being oxidized by the oxygen and blown away in the form of slag. It is very difficult to cut cast iron with such a torch and, although it is possible by careful manipulation to cut away the cast iron in some degree, this cutting is extremely hard to control. If an ordinary cutting torch is used for this purpose, black spots appear in the area against which the center jet impinges, these areas resisting the action of the cutting jet so that an alternate method must be resorted to, that is to say, the metal must be first heated by the heating jet to as high a degree as practical and the oxygen jet must then be called into play in the attempt to cause the cutting to occur. So far as I am aware no previous inventor has ever been able to produce a cutting torch which would operate upon cast iron, cutting it away with a continuous action. I am unable to explain why the ordinary torch fails to function but believe that the general accepted theory is that the presence of graphite in the iron causes it to resist the ordinary oxidizing action.

For the purpose of providing a torch which will rapidly cut cast iron I have devised apparatus shown in the accompanying drawings, in which—

Fig. 1 is a section through a head and tip of a cutting torch embodying my invention.

Fig. 2 is a section on a plane represented by the line 2—2 of Fig. 1 viewed in the direction of the arrows.

Fig. 3 is a view of the bottom of the tip shown in Fig. 2.

Fig. 4 is a diagram.

In the form of the invention shown, I employ a torch having a head 11 having a central recess into which a mixed gas is supplied through a pipe 12 and into which oxygen is supplied through a pipe 13.

The mixed gas supplied through the pipe 12 may be a mixture of acetylene and oxygen, or any other combustible mixture suited to produce a high temperature, this mixture being delivered to a heating gas cavity 14 formed in the head 11. The oxygen from the pipe 13 is delivered into a cutting gas cavity 15 formed in the head 11. Secured in the head 11 by means of a nut 20 is a tip 21, this tip being preferably formed of copper and having a frustro-conical end 22 seating in gastight relationship in the central recess in the head 11 and having a shoulder 23 by means of which it is secured. Extending through the tip is a plurality of heating flame orifices 30, these orifices being preferably four or more in number, and being preferably placed equidistant from the axis of the tip. Extending through and along the axis of the tip is a cutting jet orifice 31, this orifice 31 being provided at its lower end, as viewed in Fig. 1, with a plug 32 which has an extremely small hole 33 therethrough. The hole 33 may be considered as a continuation of and forming a part of the cutting jet orifice 31 which is thus in open communication at its lower end with the cuting gas cavity 15.

The construction above described, except for the plug 32, is substantially a standard cutting torch, the orifices 30 being employed to convey a heating gas to the heating jet orifices and the cutting jet orifice 31 being provided to supply the oxygen. Such a torch works very efficiently when applied to the cutting of steel or wrought iron, the heating jet orifices heating the metal to such a degree that it is readily burned by the oxygen. For the purpose of adapting this form of torch to the cutting of cast iron, I supply the plug 32 having the small hole 33 which limits the flow of oxygen and also gives the issuing jet of oxygen a high velocity. A plurality of small passages 40 is formed in the head which connect the heating gas cavity 14 with a space 41 formed between the plug 32 and the cutting jet orifice 31. The high velocity oxygen jet passing from the plug 32 sets up an injector effect which draws mixed gas through the passages 40 into the chamber 41 and carries it through the orifice 31. The mixed gas is drawn into the space 41 in proportion to the amount of oxygen passing through the space 41.

I find that the torch thus produced operates with remarkable efficiency in the cutting of cast iron, the construction shown making it possible to continuously cut a narrow kerf in cast iron of considerable thickness, thus providing a novel development in the art of cutting metals.

In actually practice the pressure in the cavity 15 is anywhere between 90 to 120 pounds per square inch. Best results have been obtained when the pressure was above 90 pounds per square inch. Such a high pressure is necessary to procure a powerful enough jet issuing from the orifice 31 to effectively blow away the slag formed in the process of cutting.

To describe the flame as a whole with the central jet turned on, there is a cylindrical high temperature zone which has a sharp melting effect on the cast iron and also an oxidizing effect, since undoubtedly acetylene is there in small proportions to the oxygen. From the quantity of slag formed while actually cutting cast iron it is evident that an appreciable amount of oxidation takes place. In the cutting of steel small quantities of impurity in oxygen whether of acetylene or air or other gases are detrimental to the oxygen efficiency in cutting. We may therefore expect that the injection of acetylene here would tend to retard the cutting of the cast iron, but the fact that acetylene injected into the center jet in fairly large quantities provides a heating effect which would tend to accelerate the oxidizing action of excess oxygen in the center jet, establishes a balance between the two opposing effects. The result is that actually a certain amount of acetylene in the center jet makes the melting and cutting action in cast iron continuous. Whatever may be the explanation I have found that a torch so constructed may be operated to continuously cut cast iron with great efficiency.

I claim as my invention:

1. In a torch for cutting cast iron the combination of: a tip having an orifice carrying a heating gas and an orifice carrying a cutting gas, there being means for mixing heating gas with the cutting gas passing through said cutting orifice; and means for supplying heating and cutting gas to said first-named orifice and said second-named orifice, respectively.

2. In a torch for cutting cast iron the combination of: a tip having a central cutting jet orifice and a plurality of heating jet orifices surrounding said central cutting jet orifice; means for supplying a cutting gas to said central cutting jet orifice; and means for supplying a heating gas to said plurality of heating jet orifices, there being means for passing a portion of said heating gas into said central cutting jet orifice wherein it is mixed with said cutting gas.

3. In a torch for cutting cast iron the combination of: a head having a cutting gas cavity and a heating gas cavity; means for supplying a cutting gas to a cutting gas cavity in said head; means for supplying a heating gas to a heating gas cavity in said head; a tip having a central cutting jet orifice extending therethrough, the inner end thereof being in open communication with said cutting gas cavity, and a plurality of heating jet orifices extending through said tip and in open communication with said heating gas cavity, said tip having small passages for passing heating gas into said central cutting jet orifice; and means for securing said tip in said head.

4. In a torch for cutting cast iron the combination of: a head having a cutting gas cavity and a heating gas cavity; means for supplying a cutting gas to a cutting gas cavity in said head; means for supplying a heating gas to a heating gas cavity in said head; a tip having a central cutting jet orifice extending therethrough, the inner end thereof being in open communication with said cutting gas cavity, and a plurality of heating jet orifices extending through said tip and in open communication with said heating gas cavity, said tip having small passages for passing heating gas from said heating gas cavity into said central cutting jet orifice; and means for securing said tip in said head.

5. In a torch for cutting cast iron the combination of: a head having a cutting gas cavity and a heating gas cavity; means for supplying a cutting gas to a cutting gas cavity in said head; means for supplying a heating gas to a heating gas cavity in said head; a tip having a central cutting jet orifice extending therethrough, the inner end thereof being in open communication with said cutting gas cavity, and a plurality of heating jet orifices extending through said tip and in open communication with said heating gas cavity, said tip having small passages for passing heating gas into said central cutting jet orifice; means for limiting the flow of cutting gas from said cutting gas cavity into said central cutting jet orifice; and means for securing said tip in said head.

6. In a torch for cutting cast iron the combination of: a head having a cutting gas cavity and heating gas cavity; means for supplying a cutting gas to a cutting gas cavity in said head; means for supplying a heating gas to a heating gas cavity in said head; a tip having a central cutting jet orifice extending therethrough, the inner end thereof being in open communication with said cutting gas cavity, and a plurality of heating jet orifices extending through said tip and in open communication with said heating gas cavity, said tip having small passages for passing heating gas from said heating gas cavity into said central cutting jet orifice; means for limiting the flow of cutting gas from said cutting gas cavity into said central cutting jet orifice; and means for securing said tip in said head.

In testimony whereof, I have hereunto set my hand at Los Angeles, California, this 14th day of January, 1926.

ROBERT G. WULFF.